United States Patent
Kelsey

(10) Patent No.: US 10,313,708 B1
(45) Date of Patent: *Jun. 4, 2019

(54) DISTRIBUTED UPLOAD OF TELEVISION CONTENT

(71) Applicant: SiliconDust USA Inc., Pleasanton, CA (US)

(72) Inventor: Nicholas John Kelsey, Milpitas, CA (US)

(73) Assignee: SiliconDust USA Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,058

(22) Filed: Aug. 15, 2017

Related U.S. Application Data

(63) Continuation of application No. 14/949,629, filed on Nov. 23, 2015, now Pat. No. 9,749,663.

(60) Provisional application No. 62/123,680, filed on Nov. 23, 2014.

(51) Int. Cl.
| | |
|---|---|
| *H04N 21/222* | (2011.01) |
| *H04N 21/239* | (2011.01) |
| *H04N 21/2743* | (2011.01) |
| *H04N 21/4147* | (2011.01) |
| *H04N 21/439* | (2011.01) |
| *H04N 21/44* | (2011.01) |

(52) U.S. Cl.
CPC ....... *H04N 21/222* (2013.01); *H04N 21/2393* (2013.01); *H04N 21/2743* (2013.01); *H04N 21/4147* (2013.01); *H04N 21/4398* (2013.01); *H04N 21/44004* (2013.01)

(58) Field of Classification Search
CPC ............. H04N 21/222; H04N 21/2393; H04N 21/2743; H04N 21/4147; H04N 21/4398; H04N 21/44004
See application file for complete search history.

(56) References Cited

U.S. PATENT DOCUMENTS

| | | |
|---|---|---|
| 8,874,842 B1 | 10/2014 | Kimmel et al. |
| 9,112,943 B1 | 8/2015 | Vulkan |
| 2005/0094206 A1 | 5/2005 | Tonisson |
| 2005/0283791 A1 | 12/2005 | McCarthy |
| 2006/0117379 A1 | 6/2006 | Bennett |
| 2006/0200736 A1* | 9/2006 | Smit ................. H04L 29/06027 715/203 |
| 2008/0133538 A1* | 6/2008 | Chavez ............... H04L 67/104 |
| 2009/0288116 A1 | 11/2009 | Zalewski |

(Continued)

*Primary Examiner* — Randy A Flynn
(74) *Attorney, Agent, or Firm* — NovoTechIP International PLLC

(57) ABSTRACT

An apparatus including a tuner configured for receiving television signals; a CPU configured to cause the apparatus to perform operations including receiving configuration data from a first server; receiving a broadcast data stream for the television content via the tuner; obtaining a first plurality of data chunks from the broadcast data stream, wherein each data chunk encodes a portion of audio and/or video included in the broadcast data stream; determining, based on the configuration data, which of the first plurality of data chunks are included in a second plurality of data chunks for uploading, wherein at least one of the first plurality of data chunks is not included in the second plurality of data chunks; and uploading the second plurality of data chunks to a second server.

14 Claims, 3 Drawing Sheets

(56) References Cited

U.S. PATENT DOCUMENTS

| | | | |
|---|---|---|---|
| 2010/0058405 A1* | 3/2010 | Ramakrishnan | ............................ H04N 21/47202 725/97 |
| 2010/0123830 A1* | 5/2010 | Vunic | .............. H04N 21/44008 348/700 |
| 2012/0198335 A1* | 8/2012 | Huang | ............ H04N 21/23430 715/716 |
| 2012/0284765 A1 | 11/2012 | Killick | |
| 2013/0290557 A1* | 10/2013 | Baratz | ............... H04N 21/41407 709/231 |
| 2014/0056574 A1* | 2/2014 | Mostoufi | ............ H04N 21/2743 386/278 |
| 2014/0122451 A1* | 5/2014 | Euresti | ................ G06F 17/3015 707/693 |
| 2014/0156866 A1* | 6/2014 | Kallstrom | ........... H04L 65/1013 709/232 |
| 2015/0089019 A1* | 3/2015 | Chou | .................. H04L 67/1097 709/217 |
| 2015/0135259 A1* | 5/2015 | Ilyadis | ................ H04L 63/0227 726/1 |
| 2015/0350714 A1 | 12/2015 | Normile | |

* cited by examiner

DISTRIBUTED UPLOAD OF TELEVISION CONTENT

CROSS REFERENCE TO RELATED APPLICATION

This application claims the benefit of priority to a patent application filed at the United States Patent and Trademark Office having Ser. No. 14/949,629, filed on Nov. 23, 2015, which in turn claims priority to a provisional patent application filed at the United States Patent and Trademark Office having Ser. No. 62/123,680, filed on Nov. 23, 2014, the entire content of both of which are incorporated herein by reference.

TECHNICAL FIELD

The disclosure relates generally to television and specifically to facilitating a cloud-based digital video recorder (DVR) utilizing in-home devices to receive television content for recording.

BACKGROUND

Digital video recorders (DVRs) are popular for recording and watching television shows. Traditionally a DVR is a set-top-box like device that consists of radio-frequency tuners for receiving television signals (antenna, cable, satellite, etc), one or more large hard drives for video storage, video output hardware for driving a display such as a television screen, and a CPU for managing the scheduling tasks, the recording process, the playback process, the user interface, etc.

The cost of the in-home DVR equipment can be significantly reduced if the recordings can be stored using a cloud service via the internet, thus there is a need for a way to upload audio-video data quickly and efficiently.

SUMMARY

In a general aspect, an apparatus comprising a tuner configured for receiving television signals; and a CPU configured to cause the apparatus to perform operations comprising: receiving configuration data from a first server; receiving a broadcast data stream for the television content via the tuner; obtaining a first plurality of data chunks from the broadcast data stream, wherein each data chunk encodes a portion of audio and/or video included in the broadcast data stream; determining, based on the configuration data, which of the first plurality of data chunks are included in a second plurality of data chunks for uploading, wherein at least one of the first plurality of data chunks is not included in the second plurality of data chunks; and uploading the second plurality of data chunks to a second server.

Particular implementations may include one or more of the following features. The first plurality of data chunks may include a first data chunk and a second data chunk, and the CPU may further cause the apparatus to perform generating a respective hash value for each of the first plurality of data chunks, obtaining a first value or a first range of values based on the configuration data; calculating a first remainder by applying a first modulus operation to the respective hash value for the first data chunk; calculating a second remainder by applying the first modulus operation to the respective hash value for the second data chunk; determining that the first data chunk is included in the second plurality of data chunks in response to the first remainder being included in the first value or the first range of values; and determining that the second data chunk is not included in the second plurality of data chunks in response to the second remainder not being included in the first value or the first range of values.

The CPU may further cause the apparatus to perform obtaining parameters for an algorithmic filter based on the configuration data; and applying the algorithmic filter, using the obtained parameters, to determine which of the first plurality of data chunks are included in the second plurality of data chunks.

The CPU may further cause the apparatus to perform buffering or storing a third plurality of data chunks in a local storage of the apparatus, wherein the third plurality of data chunks is included in the first plurality of data chunks; receiving a request for a first data chunk from the second server, wherein the first data chunk is included in the third plurality of data chunks and not included in the second plurality of data chunks; and uploading, in response to the request for the first data chunk, the first data chunk to the second server. The CPU may further cause the apparatus to perform obtaining parameters for an algorithmic filter based on the configuration data; and applying the algorithmic filter, using the obtained parameters, to determine which of the first plurality of data chunks are included in the third plurality of data chunks.

The apparatus may further comprise video output hardware configured for driving a television screen; and the CPU may further cause the apparatus to perform generating a hash value based on one or more hashed data chunks included in the first plurality of data chunks, wherein the hashed data chunks include a data chunk that is not included in the second plurality of data chunks; uploading the generated hash value to the second server, obtaining, from a third server and after the uploading of the hash value, one or more received data chunks corresponding to the hashed data chunks, and outputting a video signal via the video output hardware based on the received data chunks obtained from the third server.

The first plurality of data chunks may include a first data chunk; and the CPU may further cause the apparatus to perform selecting a range of data from the broadcast data stream based on information or markers included in the broadcast data stream; and including the selected range of data in the first data chunk. The selection of the range of data from the broadcast data stream may be based on transport stream frames, transport stream sequence numbers, payload-unit-start (PUS) markers, program-clock-reference (PCR) markers, or video group of pictures (GOP) information included in the broadcast data stream.

The broadcast data stream may include data for a first sub-channel and data for a second sub-channel, wherein the television content is provided via the first sub-channel; and the second plurality of data chunks may include data from the second sub-channel.

In a general aspect, a method comprising receiving a broadcast data stream for a television content; obtaining a first plurality of data chunks from the broadcast data stream, wherein each data chunk encodes a portion of audio and/or video included in the broadcast data stream; generating a first hash value based on one or more hashed data chunks included in the first plurality of data chunks; uploading the first hash value to a first server; obtaining, from a second server and after the uploading of the first hash value, one or more received data chunks corresponding to the hashed data chunks; and driving a display based on the received data chunks obtained from the second server.

Particular implementations may include one or more of the following features. The method may further comprise receiving configuration data from a third server; determining, based on the configuration data, which of the first plurality of data chunks are included in a second plurality of data chunks for uploading, wherein at least one of the first plurality of data chunks is not included in the second plurality of data chunks, and uploading the second plurality of data chunks to the first server. The method may further comprise obtaining parameters for an algorithmic filter based on the configuration data; and applying the algorithmic filter, using the obtained parameters, to determine which of the first plurality of data chunks are included in the second plurality of data chunks.

The first plurality of data chunks may include a first data chunk; and the method may further comprise selecting a range of data from the broadcast data stream based on information or markers included in the broadcast data stream; and including the selected range of data in the first data chunk. The selection of the range of data from the broadcast data stream may be based on transport stream frames, transport stream sequence numbers, payload-unit-start (PUS) markers, program-clock-reference (PCR) markers, or video group of pictures (GOP) information included in the broadcast data stream.

A nontransitory computer readable medium may include instructions which, when executed by a processor, cause the processor to perform any of the methods described above.

In a general aspect, a method comprising identifying a first plurality of tuner-devices participating in an upload of a first plurality of data chunks obtained from a broadcast data stream for a television content, wherein the first plurality of tuner-devices includes a second plurality of tuner-devices, and each of the first plurality of data chunks encodes a portion of audio and/or video included in the broadcast data stream; sending, via a network to each of the plurality of tuner-devices, respective configuration data including parameters to be used by each of the first plurality of tuner-devices to determine which of the first plurality of data chunks to upload; and receiving, from the second plurality of tuner-devices via the network, the first plurality of data chunks, wherein one or more, but not all, of the first plurality of data chunks is received from each of the second plurality of tuner-devices.

Particular implementations may include one or more of the following features. The method may further comprise receiving a plurality of hash values in association with the first plurality of data chunks; and building a hash-to-data dictionary which associates each of the first plurality of data chunks with one of the plurality of hash values.

The first plurality of data chunks may include a second plurality of data chunks; and the method may further comprise obtaining first audio data from the first plurality of data chunks, wherein the first audio data is in a first audio encoding format; transcoding the first audio data to generate a second audio data in a second encoding format different from the first encoding format, wherein decoding of audio data in the first audio encoding format is subject to a licensing requirement or royalty and at least one technique for decoding audio data in the second audio encoding format is not subject to a licensing requirement or royalty; and modifying the second plurality of data chunks to include the second audio data.

The method may further comprise receiving, from a first tuner-device via the network, one or more hash values; determining that the received one or more hash values corresponds to one or more matching data chunks included in the first plurality of data chunks, and sending, to the first tuner-device via the network and in response to the receiving of the one or more hash values, the one or more matching data chunks.

Other features and aspects will be apparent from the following detailed description, the drawings, and the claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

The following detailed descriptions are presented to enable any person skilled in the art to make and use the disclosed subject matter. For purposes of explanation, specific nomenclature is set forth to provide a thorough understanding. However, it will be apparent to one skilled in the art that these specific details are not required to practice the disclosed subject matter. Descriptions of specific applications are provided only as representative examples. Various modifications to the preferred embodiments will be readily apparent to one skilled in the art, and the general principles defined herein may be applied to other embodiments and applications without departing from the scope of this disclosure. The sequences of operations described herein are merely examples, and the sequences of operations are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness. This disclosure is not intended to be limited to the embodiments shown, but is to be accorded the widest possible scope consistent with the principles and features disclosed herein.

This disclosure describes, among other things, a system and method for quick and efficient upload of live television content and/or recorded television content by using specialized tuner-devices and internet server equipment. The tuner-devices can be located at receiving locations (for example, homes, offices, etc.) receiving a television signal, such as, but not limited to, an "over the air" television broadcast from a broadcaster station, that includes a broadcast data stream. Each tuner-device can receive the complete broadcast data stream from the broadcaster and upload, to a server and via a network (for example, the Internet), abbreviated data in the form of a series of data hashes along with a portion of the complete broadcast data stream. The server can use the series of data hashes and the broadcast data stream received from multiple tuner-devices to build a server-side hash-to-data dictionary which can then be used to recover the original broadcast data stream for each tuner-device based on the hash data received from the tuner-devices. This disclosure includes custom techniques optimized for uploading live television content and ensuring no data leakage between customers when that is a requirement.

In one implementation, the in-home tuner-devices can calculate and record hash data for a broadcast data stream, without uploading a portion of the broadcast data stream, and a centralized source including an antenna, cable feed, satellite feed, etc., builds a hash-to-data dictionary used to rebuild the broadcast data stream from hash data.

Figure 1:
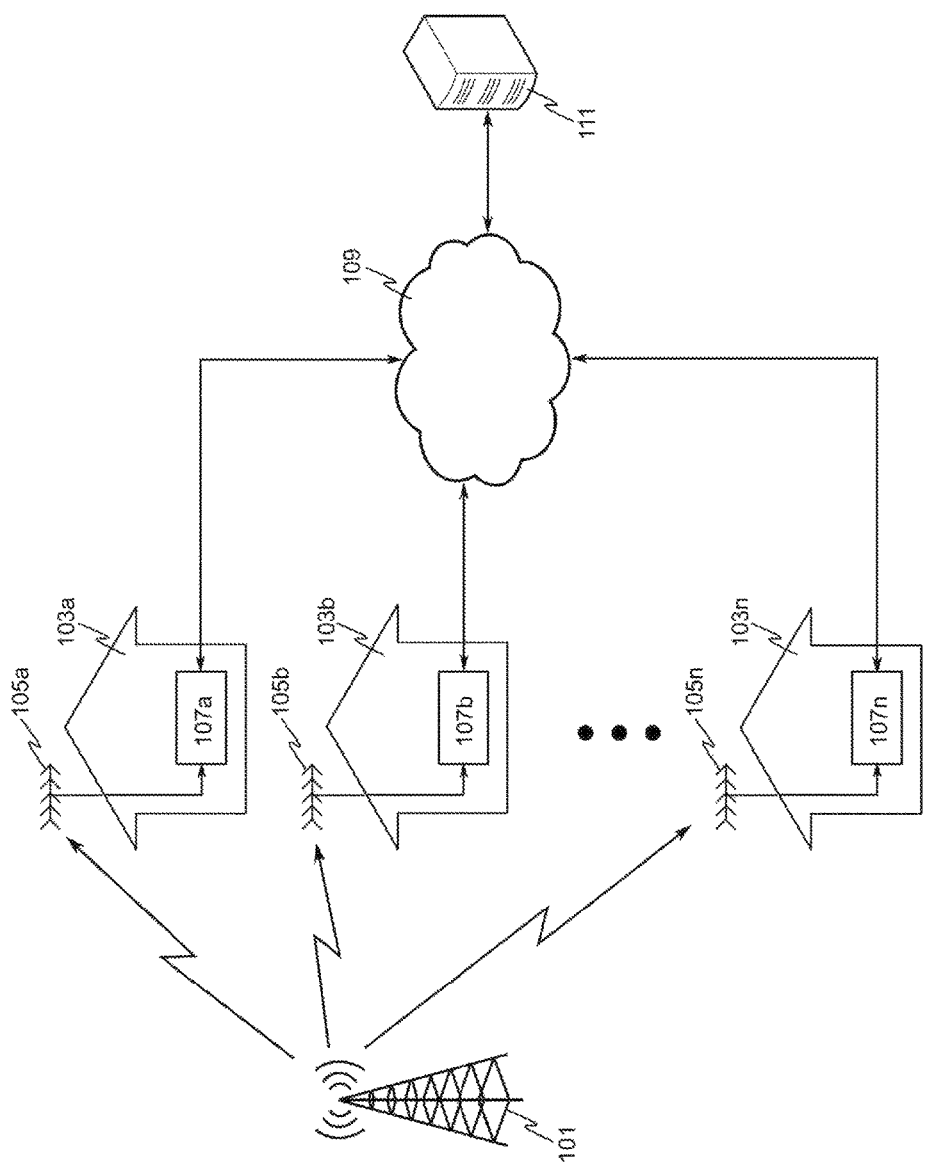
FIG. 1 illustrates a diagram of a system for distributed upload of television content, according to an embodiment of the disclosure.

FIG. 1 illustrates a high-level diagram of a system for distributed upload of television content, according to an embodiment of the disclosure. As illustrated in FIG. 1, n homes 103a-103n are located in broadcast range of a television broadcaster 101. For example, the television broadcaster 101 may transmit a television signal including a broadcast data stream according to the ATSC or DVB broadcast formats. In some examples, the broadcast data stream may be received via a cable television feed, a satellite television feed, or other suitable source. The broadcast data stream multiplexes audio, video, and program information data according to a multimedia container format, such as the MPEG transport stream (also known as MPEG-TS, MTS, or TS) format. The broadcast data stream received from broadcaster 101 can be received independently by antennas 105a-105n. The television signal is received independently by tuner-devices 107a-107n via the antennas 105a-105n respectively. The tuner-devices 107a-107n can communicate with server 111 via the network 109 (for example, the Internet).

Each of the tuner-devices 107a and 107b is configured to divide the broadcast data stream 201 into multiple data chunks suitable for transfer between tuner-devices 107a-107n and server 111 via network 109. In one implementation, tuner-devices 107a-107n are each configured to calculate and record a set of hash values for the multiple data chunks. The server 111 can send configuration data to each of tuner-devices 107a-107n. The configuration data may include parameters for an algorithmic filter which, when applied to the incoming broadcast data stream, can determine which of the data chunks are to be uploaded by each of the tuner-devices 107a-107n to server 111 via network 109. The tuner-devices 107a-107n may be configured to upload the data chunks to the server 111 based on the configuration data and without further request from server 111.

For example, if n is the number of tuner-devices 107a-107n participating in an upload of a broadcast data stream, and in is the number of data chunks into which the broadcast data stream is divided, algorithmic filters applied by each of the tuner-devices 107a-107n to their respective incoming broadcast data stream can be configured to result in each of tuner-devices 107a-107n uploading a different portion of the m data chunks for the broadcast data stream, with each portion being on average approximately m/n chunks. The algorithmic filter can be implemented in various ways. For example, a modulus operation can be applied to the hash value of each data chunk, then each of the tuner-devices 107a-107n may be configured to upload to server 111 those data chunks for which the remainder of the modulus operation matches a value or a range of values obtained from configuration data sent by server 111 to that tuner-device.

Real-world operation sees varying upload speeds from different tuner-devices, often due to locational and Internet service provider differences. In one implementation, each tuner-device 107a-107n can be given a range of remainder values to match, with that range being periodically changed/adjusted by the server 111 to adjust for different upload speeds or the identification of additional tuner-devices for uploading a broadcast data stream or the identification of tuner-devices no longer participating in uploading the broadcast data stream. For example, the hash values for the data chunks may be processed by a modulus 65536 operation resulting in a remainder in the range of 0 to 65535 for each data chunk. When this remainder is within the configured range for a given tuner-device 107a-107n, that tuner-device automatically uploads the respective data chunk to server 111 without receiving a request from the server. The size of the range assigned to each of the tuner-devices 107a-107n may be, for example, a function of the total number of tuner-devices being configured to upload a broadcast data stream and an upload speed determined for each tuner-device. Each remainder value should be assigned to at least one of the uploading tuner-devices to ensure all of the data chunks are uploaded, although for redundancy some or all of the remainder values may each be assigned to two or more of the uploading tuner devices.

Tuner-devices 107a-107n can buffer the broadcast data stream or a part of the broadcast data stream for a period of time and/or limited by buffer/storage size. When a particular data chunk for the broadcast data stream is not received by the server 111 based on automatic upload rules, the server 111 may request the missing data chunk identified by hash value from one or more other tuner-devices 107a-107n Examples of conditions leading to missed data chunks include reception errors, communication issues, etc.

As previously discussed, the server 111 can send configuration data to each tuner-device 107a-107n participating in uploading a broadcast data stream. The configuration data may include parameters for an algorithmic filter which, when applied to data chunks obtained based on the incoming broadcast data stream, determines which data chunks are buffered/stored for possible upload if requested by the server 111. This can reduce the amount of memory or storage required to buffer the data chunks for the broadcast data stream. In the n tuner-device and m data chunk example above, each tuner-device 107a-107n may be configured to, for example, buffer approximately (k/n)th (k<n) of the data chunks for the broadcast data stream and automatically upload (1/n)th of the data chunks to server 111. When an expected data chunk is not received by the server 111 (determined based on, for example, a hash value received from tuner-devices 107a-107n for which a corresponding data chunk was not received) based on the automatic upload logic, the server 111 can select one of the k tuner-devices 107a-107n expected to have buffered/stored the missing data chunk of the broadcast data stream.

The broadcast data stream received by the tuner-device 107a-107n from the broadcaster 101 may be received as transport stream frames and the tuner-devices 107a-107n can be configured to treat each transport stream frame as a data chunk. Such transport frames are a feature of MPEG-2 and E1264/MPEG-4 encoded multimedia data streams. In some instances, a received transport stream frame may be marked with a transport-error flag indicating that the frame data was not reliably received by one of the tuner-devices 107a-107n. In such cases, the affected tuner-device 107a-107n may drop or discard the marked transport stream frame (e.g., bad frame) and not generate a hash value in connection with the marked frame. While the bad frame data may be uploaded to the server 111, the bad frame data may serve little use as the marked frame can be a corrupt data frame. The server 111 can reconstitute the broadcast data stream with the corresponding data chunk missing due to the tuner-device not having the missing hash value, thus ensuring there is no leakage of data from other customers/tuner-devices that successfully received the bad frame.

Since multiple tuner-devices 107a-107n can be configured to receive the same broadcast data stream from broadcaster 101, the sequence of hash data and corresponding data chunks from multiple tuner-devices 107a-107n can be combined to build a complete sequence of data chunks for the broadcast data stream even though some tuner-devices 107a-107n may have failed to receive some of the data chunks due to problems such as poor reception. This technique can be used to combine results from multiple tuner-devices 107a-107n within the same customer's home 103a-103n, or across customers when licensing permits.

Groups of multiple data chunks obtained from a broadcast data stream may be hashed as a unit or hash data associated with multiple data chunks may be further hashed (in other words, a hash of hashes) to create a hash uniquely identifying the groups of data chunks. This enables further data compression for data sent from tuner-devices 107a-107n to server 111 by requiring less hash data to be uploaded when there is no reception loss.

Various video/audio coding formats may be used for coding video or audio data of a broadcast data stream, and information provided by such formats may be used to obtain data chunks from the broadcast data stream. For example, the range of data in a data chunk or in a group of data chunks can be based on video group of pictures (GOP) structures, payload-unit-start (PUS) markers in the broadcast data stream, or program-clock-reference (PCR) markers in the broadcast data stream, or a combination of these technologies. The terms GOP, PUS, and PCR should be well understood by those skilled in the art.

The range of data in a data chunk or in a group of data chunks can be based on a range or point of repetition of sequence numbers. For example, transport stream sequence numbers, also referred to as "continuity counters," can be per elementary stream with 4-bits of resolution counting from 0 to 15. A data chunk can be defined, for example, as a block of transport stream frames from 0 to 15. Alternatively, the range of data in a data chunk or a group of data chunks can be based on other information or markers included in a broadcast data stream.

The data chunks can be encrypted for transport and hashed for identification in a combined operation, for example, using advanced encryption standard (AES) with cipher-block-chaining and encrypt-last-block message authentication, where the last block of encrypted data is encrypted again. The message authentication code (or MAC) bytes resulting from the combined operation can be used as a hash value that uniquely identifies the data chunk, rather than for or solely for message authentication.

In addition, common hashing techniques such as, for example, encryption algorithms, hashing algorithms, cyclic-redundancy-check, checksum, or a similar technique can be used to hash data chunks. Moreover, reduced hash resolution may be used with collisions expected and rendered unharmful by virtue of matching a stream of hash values in sequence rather than relying on each hash value being unique in isolation. This has the advantage of reducing the amount of hash data to be uploaded from each tuner-device 107a-107n, at the expense of additional matching effort by server 111.

A tuner-device 107a-107n may participate in hash and data chunk upload of one or more sub-channels within a broadcast data stream. This increases coverage of lower-value sub-channels when higher-value sub-channels are more commonly viewed. The server 111 may make recording suggestions based on the need to ensure sufficient tuner-devices 107a-107n are participating in the recording of a particular television content (for example, a show, a time-slot, a channel, a broadcast stream, etc.). The suggestion logic may take into account one or more sub-channels of a particular broadcast stream and suggest a recording of a show on any one of the sub-channels in a target timeslot. The tuner-device 107a-107n can then participate in uploading data chunks from the sub-channels of that broadcast stream. The data chunks can be stored on a local storage of the tuner-device 107a-107n and then uploaded to server 111 in the background, possibly slower than real time.

The tuner-device 107a-107n can transcode audio and/or video from the format it is broadcast in to a more compressed format. When transcoding is used, the hash generation can be done on the original data before transcode to allow matching of hash data despite differences in resulting transcoded data. When local storage at the tuner-device 107a-107n is used, the hash data and transcoded video data can be stored maintaining the relationship.

In some implementations, server 111 may be configured to obtain first audio data from the data chunks received for a broadcast data stream, where the first audio data is in a first encoding format. Then, server 111 may transcode the first audio data to generate a second audio data in a second encoding format that is different from the first encoding format. For example, United States ATSC broadcasts typically encode audio in the Dolby Digital AC-3 or A/52 audio format, and in Japan the AAC format is used for audio. The server 111 may be configured to transcode the original Dolby Digital AC-3, A/52 audio, or AAC audio into a different encoding format, such as, but not limited to, MP3, AAC, PCM, FLAC, Ogg Vorbis, or OPUS. The server 111 may then modify the data chunks to include the second audio data; for example, the second audio data may be added as an additional audio data stream, or the second audio data may replace the first audio data. As a result, server 111 may take audio data in a first encoding format that is subject to a licensing requirement or royalty for decoding the audio data, and server 111 may instead provide transcoded audio data in a second audio encoding format that is not subject to any such licensing requirement or royalty, thereby reducing the cost of a playback device or software used to display a television content provided via server 111.

In some instances, the hash-to-data dictionary can be provided to the server 111 via another system using a central antenna feed, cable feed, satellite feeds, etc. In such cases, the need for uploading the hash-to-data dictionary to server 111 by the tuner-devices 107a-107n can be reduced or eliminated. By optionally requiring that broadcast data streams be assembled at the server 111 by following the exact hash data from the customer's tuner-device 107a-107n, it can be guaranteed that no data is delivered to the customer that was not received by the customer's tuner-device 107a-107n.

In some implementations, a television content may be received by a tuner-device associated with a first user or user account, and playback of the television content may be performed by a second device associated with the first user or user account. For example, tuner-device 107a may perform a user authentication procedure with server 111 to identify tuner-device 107a as being associated with the first user or user account. Tuner-device 107a may receive a broadcast stream for the television content, generate one or more hash values each based on one or more data chunks obtained from the broadcast stream, and upload the hash values to server 111. A tablet device (not illustrated in FIG. 1) may also perform a user authentication procedure with server 111 to identify the tablet device as also being associated with the first user or user account. Then the tablet device may perform playback of the television content by obtaining data chunks or a video stream from server 111 based on server 111 having received associated hash values or another proof of reception of the television content from tuner-device 107a. Playback by the tablet device may occur nearly simultaneously with the receiving of the broadcast stream. For example, the tablet device may obtain a portion of the television content from server 111 once server 111 has received an associated hash value or other proof or reception from tuner-device 107a Although this paragraph discusses a tablet device as an example, other playback devices may be used, including, but not limited to, a notebook or desktop computer, a smartphone, a head-mounted display, or another tuner-device (such as tuner-device 107b).

Figure 2:
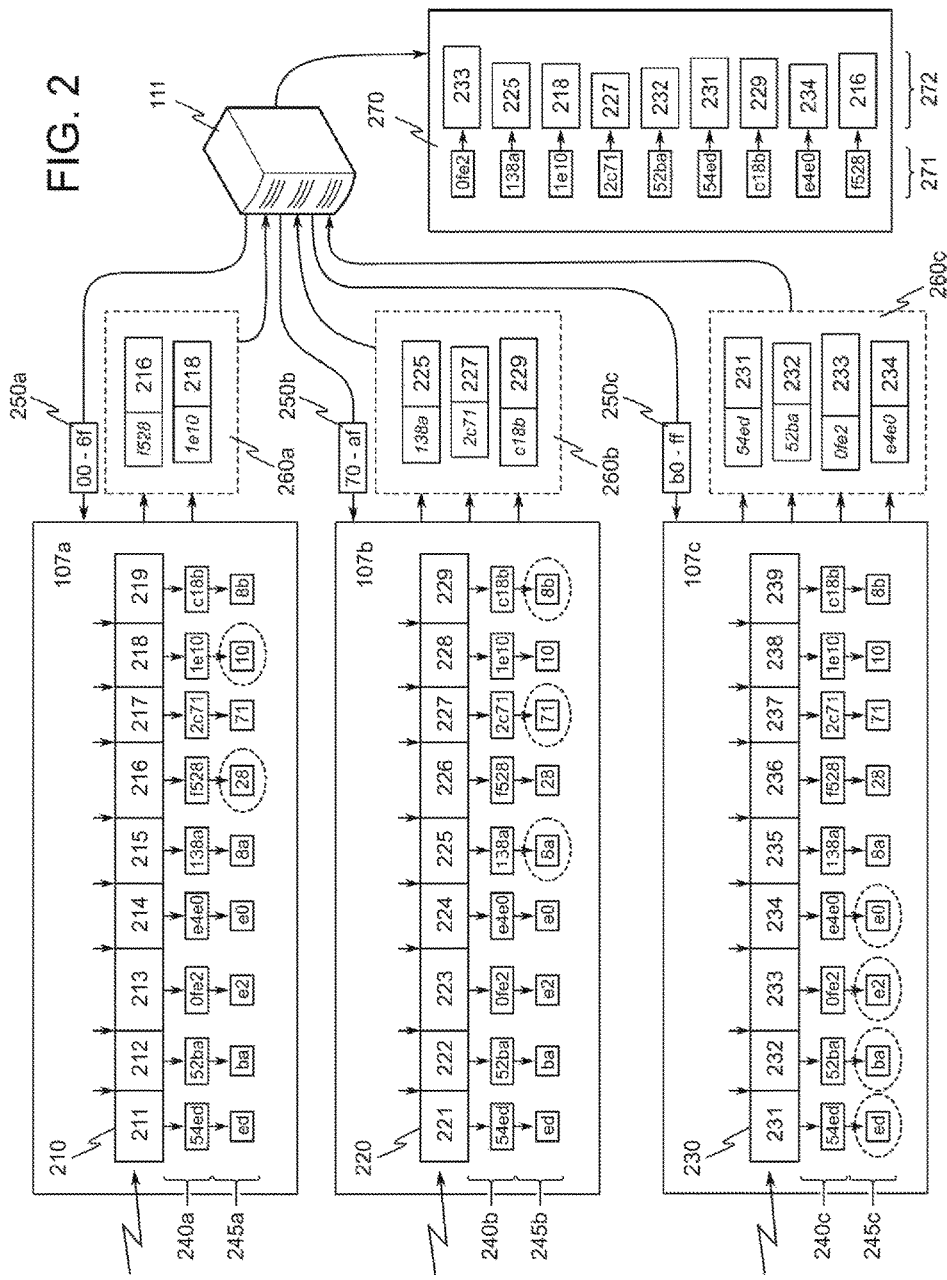
FIG. 2 illustrates examples of interactions between tuner-devices and a server for distributed upload of a broadcast data stream for a television content, according to an embodiment of the disclosure.

FIG. 2 illustrates examples of interactions between tuner-devices 107a-107c and server 111 for distributed upload of a broadcast data stream for a television content, according to an embodiment of the disclosure. Although only three tuner-devices 107a-107c are illustrated in FIG. 2, in many instances significantly more than three tuner-devices may participate in a distributed upload of a broadcast data stream for a television content. However, the application of the general concepts illustrated in FIG. 2 should be understood in view of the entirety of this disclosure.

The server 111 identifies tuner-devices 107a-107c as participating in uploading data chunks obtained from a broadcast data stream for a television content. It is noted that a single television content, such as, but not limited to, a particular episode of a television show, may have more than one associated broadcast data stream. For example, three neighbors, each with a respective tuner-device, may receive the television content via three different sources: broadcast television, cable television, and satellite television. In general, the three broadcast data streams received via each source will have differences. As a result, there will be differences in data chunks obtained from each of the differing broadcast data streams, which will prevent matching and assembling data chunks among the different broadcast data streams. Accordingly, the identification by server 111 of tuner-devices participating in uploading data chunks may take into account not only the television content, but also the source from which the broadcast data stream for the television content is obtained.

The server 111 sends, via a network (not illustrated in FIG. 2), such as Internet 109 illustrated in FIG. 1, configuration data 250a-250c to each of the participating tuner-devices 107a-107c The configuration data 250a-250c may include parameters used by each of the tuner-devices 107a-107c to determine which data chunks should be uploaded to server 111. In the particular example illustrated in FIG. 2, the configuration data 250a-250c indicates ranges of remainder values for a modulus 256 operation applied to a hash value generated for each data chunk. Configuration data 250a indicates to tuner-device 107a that data chunks for which a remainder value of 0x00-0x6f (hexadecimal) should be uploaded to server 111. Configuration data 250b indicates to tuner-device 107b that data chunks for which a remainder value of 0x70-0xaf (hexadecimal) should be uploaded to server 111. Configuration data 250c indicates to tuner-device 107c that data chunks for which a remainder value of 0xb0-0xff (hexadecimal) should be uploaded to server 111. Server 111 may determine the size of each range based on, for example, a comparison of past upload speeds to server 111 by each of tuner-devices 107a-107b.

At an appropriate time, each of tuner-devices 107a-107c receives a broadcast data stream for the television content of interest. Tuner-device 107a receives broadcast data stream 210, tuner-device 107b receives broadcast data stream 220, and tuner-device 107c receives broadcast data stream 230. To simplify the discussion, in the example illustrated in FIG. 2, all three tuner-devices 107a-107c start and stop receiving at the same times. Thus, in this particular example, assuming that no errors occurred in receiving the broadcast data streams, each of broadcast data streams 210, 220, and 230 is identical. However, in some instances, the receiving may start and stop at different times among the participating tuner-devices; as a result, some tuner-devices may obtain data chunks not obtained by other tuner-devices.

Each of tuner-devices 107a-107c obtains a plurality of data chunks from the broadcast data stream that it receives. For example, tuner-device 107a obtains data chunks 211-219 from broadcast data stream 210, tuner-device 107b obtains data chunks 221-229 from broadcast data stream 220, and tuner-device 107c obtains data chunks 231-239 from broadcast data stream 230. Although generally many more than nine data chunks would be obtained from a broadcast data stream, only nine data chunks are shown in FIG. 2 for simplifying the illustration and its description. However, the general techniques illustrated in FIG. 2 can be extended to greater numbers of data chunks in view of this disclosure. Data chunks can be obtained while a broadcast data stream is being received. For example, tuner-device 107a may obtain data chunk 211 at a time when the portion of the broadcast data stream corresponding to data chunk 212 has not yet been fully received. Likewise, subsequent handling of the data chunks, such as hashing and sending to server 111, may be performed before the broadcast data stream has been fully received. Data chunks may be generated by various techniques, as discussed above. As illustrated in FIG. 2, the data chunks may be of different sizes; for example, data chunk 216 is larger than data chunk 212. Each of the tuner-devices 107a-107c follows the same scheme for obtaining the data chunks. As a result, the data chunks obtained by each of the tuner-devices 107a-107c are identical: data chunks 211, 221, and 231 are identical, data chunks 212, 222, and 232 are identical, and so on.

Each of tuner-devices 107a-107c is configured to generate hash values for each of the data chunks. For example, tuner-device 107a generates hash values 240a for data chunks 211-219, tuner-device 107b generates hash values 240b for data chunks 221-229, and tuner-device 107c generates hash values 240c for data chunks 231-239. In the particular example illustrated in FIG. 2, 16-bit hash values are generated for each data chunk, and example values are illustrated in hexadecimal format. Since the data chunks obtained by each of tuner-devices 107a-107c are identical, as a result the hash values 240a-240c across the three tuner-devices are also identical.

Each of tuner-devices 107a-107c may be configured to apply an algorithmic filter based on the data chunks, using the configuration data 250a-250c received from server 111, to determine which of the data chunks should be uploaded to server 111. In the particular example illustrated in FIG. 2, remainders 245a-245c of a modulus 256 operation applied to each of hash values 240a-240c are compared against ranges obtained from configuration data 250a-250c For example, tuner-device 107a determines the remainder value 0x28 for data chunk 216 and the remainder value 0x10 for data chunk 218 are each within the range of 0x00-0x6f indicated by configuration data 250a, as indicated by the dashed circles around the remainder values. As a result, tuner-device 107a determines that data chunks 216 and 218 are included in a plurality of data chunks 260a for uploading to server 111. Tuner-devices 107b and 107c perform similar operations, and determine their respective pluralities of data chunks 260b and 260c. Data blocks that do not pass the algorithmic filter, and consequently will not be uploaded, may be dropped or discarded, although each of the tuner-devices 107a-107c may retain their hash values as proof that the tuner-device actually received its associated data chunk, and as a key for downloading its associated data chunk from server 111 at a later time.

Each of tuner-devices 107a-107c uploads their respective pluralities of data chunks 260a-260c to server 111. In association with each data chunk, the tuner-devices 107a-107c also upload the hash values corresponding to each of the uploaded data chunks. Uploading of data chunks may be performed at various times, such as, but not limited to, shortly after obtaining a data chunk and determining it should be uploaded to server 111, or sometime after the broadcast data stream has been fully received. Once server 111 confirms a data chunk has been successfully uploaded, a tuner-device may drop or discard its copy of the data chunk. Server 111 stores the uploaded data chunks and builds/populates a hash-to-data dictionary 270 which associates each of the uploaded data chunks 272 with its corresponding hash value 271. Dictionary 270 may be used later to allow tuner-devices 107a-107c to download the data chunks 272 in response to hash values received from tuner-devices 107a-107c.

Figure 3:
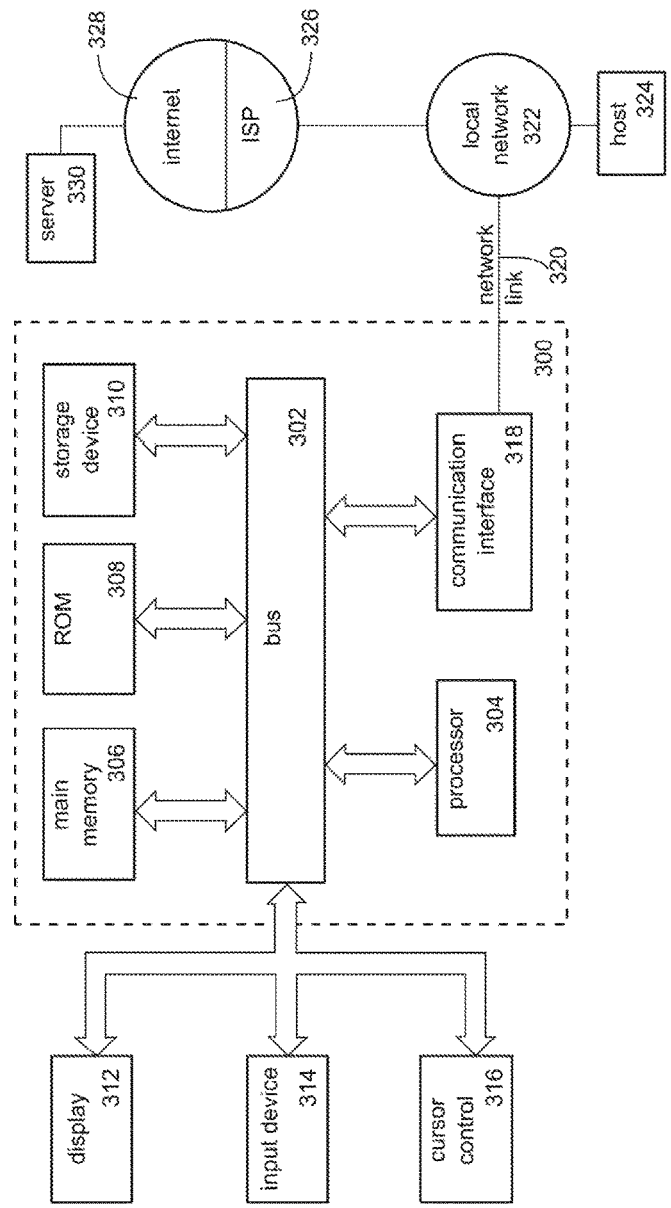
FIG. 3 is a block diagram that illustrates a computer system upon which aspects of this disclosure may be implemented.

FIG. 3 is a block diagram that illustrates a computer system 300 upon which aspects of this disclosure may be implemented, such as, but not limited to tuner-devices 107a-107n and server 111. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304e Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT) or liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. Another type of user input device is a touchscreen, which generally combines display 312 with hardware that registers touches upon display 312.

This disclosure is related to the use of computer systems such as computer system 300 for implementing the techniques described herein. In some examples, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In view of the wide variety of permutations to the embodiments described herein, this detailed description is intended to be illustrative only, and should not be taken as limiting the scope of the invention. To illustrate, while the description describes transport stream based digital television broadcasts being received by tuner based devices, embodiments are not so limited. For example, cable television, satellite television, other sources of broadcast or multicast video, audio, or non-audio/video content, non-transport-stream based content, etc. Therefore, the specification and drawings are to be regarded in an illustrative rather than a restrictive sense.

The separation of various system components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 105 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A method comprising:
   receiving configuration data from a server, wherein the configuration data comprises a first value or a first range of values;
   receiving a suggestion from the server for recording television signals pertaining to one or more particular television content;
   upon or while receiving the configuration data, receiving a broadcast data stream which includes data for the one or more particular television content;
   obtaining a first plurality of data chunks from the broadcast data stream, wherein each data chunk encodes a portion of audio and/or video included in the broadcast data stream;
   calculating a value for each of the first plurality of data chunks;
   determining, based on the respective calculated values for the plurality of data chunks and the first value or first range of values in the configuration data, which of the first plurality of data chunks are included in a second plurality of data chunks for uploading, wherein at least one of the first plurality of data chunks is not included in the second plurality of data chunks; and
uploading the second plurality of data chunks;
wherein calculating the respective values for the first plurality of data chunks comprises
generating a respective hash value for each of the first plurality of data chunks, and
applying a modulus operation to each of the respective hash values and obtaining, as a result, a remainder for each of the first plurality of data chunks; and
wherein determining which of the first plurality of data chunks are included in a second plurality of data chunks comprises:
determining, for each remainder, that the data chunk associated with the remainder is included in the second plurality of data chunks in response to the remainder being in the value or in the range of values, and is not included in the second plurality of data chunks in response to the remainder not being included in the value or the range of values.

2. The method of claim 1, wherein the first plurality of data chunks includes a first data chunk, and the method further comprises:
selecting a range of data from the broadcast data stream based on information or markers included in the broadcast data stream; and
including the selected range of data in the first data chunk.

3. The method of claim 1, further comprising storing the first plurality of data chunks and the second plurality of data chunks.

4. A non-transitory computer readable medium including instructions which, when executed by a processor, cause the processor to perform the method of claim 1.

5. A method comprising:
receiving a suggestion for recording a particular television content;
identifying a first tuner-device and a second tuner-device as participating in an upload of a plurality of data chunks obtained from a broadcast data stream for the particular television content;
determining respective upload speeds of the first tuner-device and of the second tuner-device;
generating, based on the respective upload speeds of the first tuner-device and of the second tuner-device, a first value or a first range of values for the first tuner-device and a second value or a second range of values for the second tuner-device;
sending, via a network, the first value or the first range of values to the first tuner-device and the second value or the second range of values to the second tuner-device, the first value or the first range of values to be used by an algorithmic filter of the first tuner-device to determine which of a plurality of data chunks the first tuner-device is to upload, and the second value or the second range of values to be used by an algorithmic filter of the second tuner-device to determine which of the plurality of data chunks the second tuner-device is to upload; and
receiving, from the first tuner-device via the network, a first plurality of data chunks among the plurality of data chunks, and receiving, from the second tuner-device via the network, a second plurality of data chunks among the plurality of data chunks.

6. The method of claim 5, further comprising:
receiving a plurality of hash values in association with the first plurality of data chunks; and
building a hash-to-data dictionary that associates each of the first plurality of data chunks with one of the plurality of hash values.

7. The method of claim 5, further comprising:
storing by the first tuner-device the plurality of data chunks the first tuner-device is to upload; and
uploading the plurality of data chunks the first tuner-device is to upload in a background.

8. The method of claim 7, wherein uploading the plurality of data chunks the first tuner-device is to upload occurs at a speed slower than real time.

9. The method of claim 5, further comprising:
receiving, from the first tuner-device via the network, one or more hash values;
determining that the received one or more hash values corresponds to one or more matching data chunks included in the first plurality of data chunks data received from the first tuner-device, or the second plurality of data chunks received from the second tuner-device; and sending, to the first tuner-device via the network and in response to the receiving of the one or more hash values, the one or more matching data chunks.

10. A system comprising:
a server comprising a processor configured to cause the server to perform operations comprising:
generating a suggestion for recording a particular television content;
identifying a first tuner-device and a second tuner-device as participating in an upload of a plurality of data chunks obtained from a broadcast data stream for the particular television content;
determining respective upload speeds of the first tuner-device and of the second tuner-device;
generating, based on the respective upload speeds of the first tuner-device and of the second tuner-device, a first value or a first range of values for the first tuner-device and a second value or a second range of values for the second tuner-device;
sending, via a network, the first value or the first range of values to the first tuner-device and the second value or the second range of values to the second tuner-device, the first value or the first range of values to be used by an algorithmic filter of the first tuner-device to determine which of a plurality of data chunks the first tuner-device is to upload, and the second value or the second range of values to be used by an algorithmic filter of the second tuner-device to determine which of the plurality of data chunks the second tuner-device is to upload; and
receiving, from the first tuner-device via the network, a first plurality of data chunks among the plurality of data chunks, and receiving, from the second tuner-device via the network, a second plurality of data chunks among the plurality of data chunks.

11. The system of claim 10, wherein the processor is further configured to cause the server to perform operations comprising:
receiving a plurality of hash values in association with the first plurality of data chunks; and
building a hash-to-data dictionary that associates each of the first plurality of data chunks with one of the plurality of hash values.

12. The system of claim 10, further comprising:
the first tuner device, wherein the first tuner device is configured to perform operations including:
storing the plurality of data chunks the first tuner-device is to upload; and
uploading the plurality of data chunks the first tuner-device is to upload in a background.

13. The system of claim 12, wherein uploading the plurality of data chunks the first tuner-device is to upload occurs at a speed slower than real time.

14. The system of claim 10, wherein the processor is further configured to cause the server to perform operations comprising:
receiving, from the first tuner-device via the network, one or more hash values;
determining that the received one or more hash values corresponds to one or more matching data chunks included in the first plurality of data chunks data received from the first tuner-device, or the second plurality of data chunks received from the second tuner-device; and sending, to the first tuner-device via the network and in response to the receiving of the one or more hash values, the one or more matching data chunks.

\* \* \* \* \*